US011576531B2

(12) United States Patent
Olson et al.

(10) Patent No.: US 11,576,531 B2
(45) Date of Patent: Feb. 14, 2023

(54) MODULAR MULTI-FUNCTION THERMALLY-INSULATED TOP-LOADING FOOD TRANSPORT CABINET AND SERVING PLATFORM

(71) Applicant: INTERMETRO INDUSTRIES CORPORATION, Wilkes-Barre, PA (US)

(72) Inventors: Jeffrey C. Olson, Dallas, PA (US); Todd Robinson, Nazareth, PA (US)

(73) Assignee: InterMetro Industries Corporation, Wilkes-Barre, PA (US)

(*) Notice: Subject to any disclaimer, the term of this patent is extended or adjusted under 35 U.S.C. 154(b) by 433 days.

(21) Appl. No.: 16/777,307

(22) Filed: Jan. 30, 2020

(65) Prior Publication Data
US 2020/0237163 A1     Jul. 30, 2020

Related U.S. Application Data

(60) Provisional application No. 62/798,510, filed on Jan. 30, 2019.

(51) Int. Cl.
*A47J 39/02*     (2006.01)
*A47J 47/14*     (2006.01)
(Continued)

(52) U.S. Cl.
CPC ............ *A47J 47/14* (2013.01); *A47J 36/2483* (2013.01); *A47J 39/02* (2013.01); *B65D 25/02* (2013.01); *B65D 81/3818* (2013.01)

(58) Field of Classification Search
CPC ........ A47J 47/14; A47J 36/2483; A47J 36/24; A47J 36/26; A47J 39/02; B65D 25/02; B65D 81/3818
(Continued)

(56) References Cited

U.S. PATENT DOCUMENTS

| 8,887,515 | B2 | 11/2014 | Patstone |
| D859,086 | S | 9/2019 | Olson et al. |
| 2013/0008909 | A1* | 1/2013 | Terracciano ............ A47J 39/02 220/592.2 |

OTHER PUBLICATIONS

Metro Mightylite Insulated Top-Load Food Carriers_Spec Sheet_13.61 copyright 2019.
(Continued)

*Primary Examiner* — Don M Anderson
*Assistant Examiner* — Elizabeth J Volz
(74) *Attorney, Agent, or Firm* — Harness, Dickey & Pierce, P.L.C.

(57) ABSTRACT

A modular, top-loading, food transport cabinet and serving platform apparatus is disclosed in various embodiments. The food transport cabinet and serving platform is advantageous because it is alternatively configurable in both a transport condition (e.g., for transporting or delivering prepared food while maintaining a desired (hot or cold) temperature of the food) and a serving condition (e.g., presenting the prepared food for serving while maintaining a desired (hot or cold) temperature of the food). The apparatus can be configured to accommodate various food presentation and serving requirements and arrangements, including heating (e.g., chafing or direct heat) and chilling (e.g., ice) without having to remove the food items to be presented and served from the food transport cabinet to a special serving platform.

20 Claims, 10 Drawing Sheets

(51) Int. Cl.
    *B65D 81/38*     (2006.01)
    *A47J 36/24*     (2006.01)
    *B65D 25/02*     (2006.01)

(58) Field of Classification Search
    USPC ............... 220/592.01, 592.28, 574.2; 99/483
    See application file for complete search history.

(56) References Cited

OTHER PUBLICATIONS

Metro Mightylite Insulated Food Carrier Accessories_Spec Sheet_13.62 copyright 2019.

\* cited by examiner

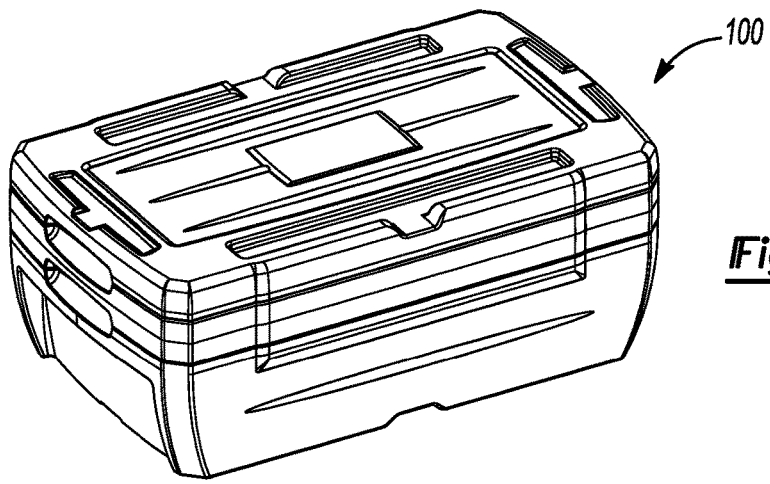
Fig-9
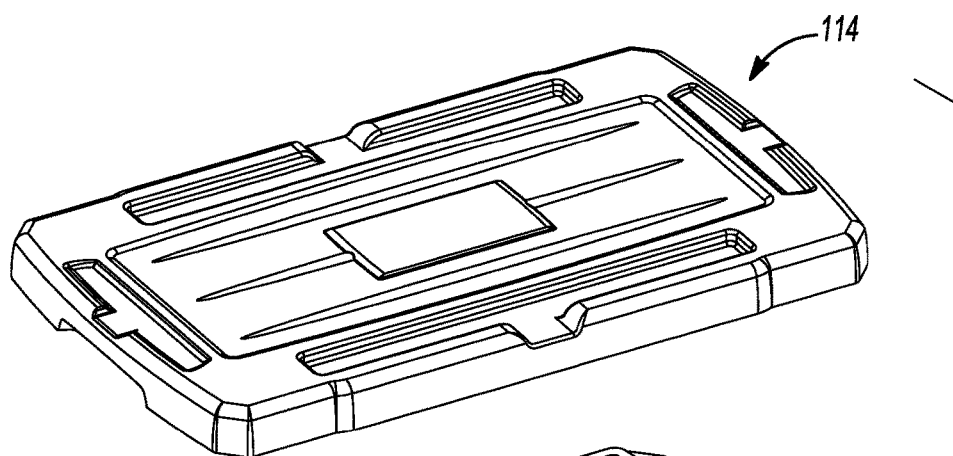
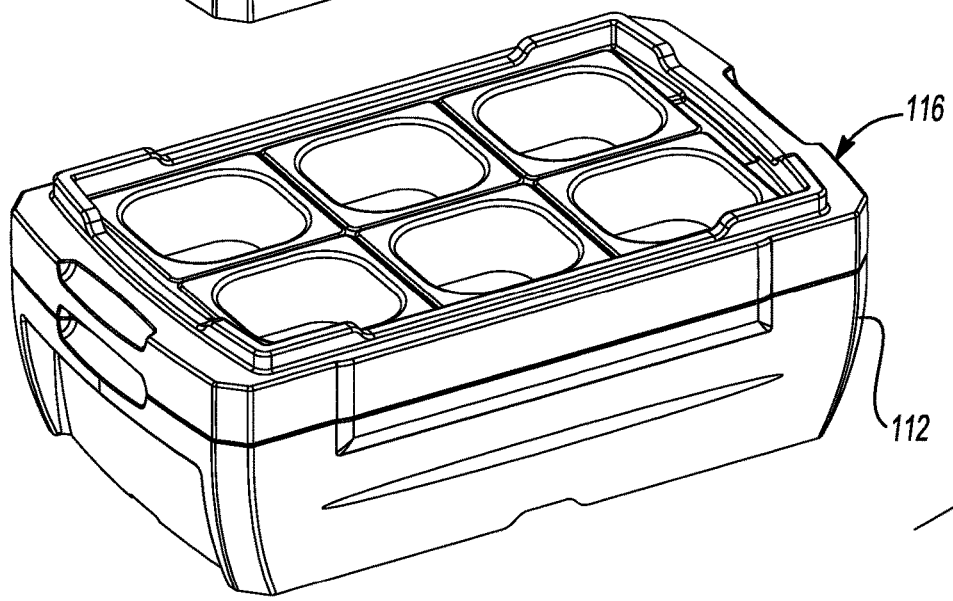
Fig-10

MODULAR MULTI-FUNCTION THERMALLY-INSULATED TOP-LOADING FOOD TRANSPORT CABINET AND SERVING PLATFORM

CROSS-REFERENCE TO RELATED APPLICATIONS

This application claims the benefit of U.S. Provisional Application No. 62/798,510, filed on Jan. 30, 2019. The entire disclosure of the above application is incorporated herein by reference.

FIELD

The present disclosure relates to insulated food carriers and more particularly to a food transport platform that provides multiple sizes and configurations and the optional ability to act as a serving platform for the transported food.

BACKGROUND

This section provides background information related to the present disclosure which is not necessarily prior art.

Insulated food carriers (also referred to as transport cabinets) are used by caterers, for example, to transport or deliver food to a venue while keeping the food hot or cold. Exemplary known top-loading transport cabinets 1, 2 are shown in FIGS. 1A and 1B. Typical top-loading food serving pan transport cabinets generally accommodate multiple food serving pans (e.g., steam-table pans or gastronorm pans), stacked on top of each other. The entire serving pan (e.g., including its rim) fits inside the carrier. At the venue, the caterer then typically sets up separate chafing equipment for presenting and serving the food. The serving pans and food have to be transferred to the chafing equipment, requiring time and labor.

SUMMARY

This section provides a general summary of the disclosure, and is not a comprehensive disclosure of its full scope or all of its features.

The present disclosure describes a modular, multi-function, thermally-insulated, top-loading food transport cabinet and serving platform apparatus. The apparatus provides a food carrier system can be configured to function as either or both a food/pan carrier or a food/pan server. The apparatus may be used as an insulated open vessel for presentation and service of food items and beverages. Additionally, apparatus is designed to securely stack with other food carriers.

In one aspect of the disclosure, the apparatus defines a cabinet base, a cabinet lid and an accessory adapter. A serving pan having a peripheral rim is supported at the peripheral rim by the accessory adapter so that the serving pan occupies at least a portion of an interior space of the cabinet base.

The apparatus is alternatively configurable in both a transport condition and a serving condition. The bottom side of the accessory adapter is configured to removably attach to the cabinet base and the top side of the accessory adapter is configured to removably attach to the cabinet lid. When the food transport cabinet and serving platform is in the transport condition, the accessory adapter is disposed between the cabinet base and the cabinet lid, the bottom side of the accessory adapter is sealingly attached and to the cabinet base and the top side of the accessory adapter is sealingly attached to the cabinet lid. When the apparatus is in the serving condition, the cabinet lid is detached from the second side of the accessory adapter while the first side of the accessory adapter remains sealingly attached to the cabinet base.

The cabinet base can be a box-like receptacle defining the interior space and comprising an open upper end and a first connecting structure located at the upper end. The first connecting structure extends along at least a portion of a perimeter of the upper end, and the first connecting structure can have a first peripheral wall protruding from the upper end in a first direction.

The cabinet lid can have an exterior side and an interior side and a second connecting structure located on the interior side. The second connecting structure can include a second peripheral wall projecting from the interior side and a peripheral channel located laterally adjacent to the second peripheral wall.

The accessory adapter includes a third connecting structure that is complementary to the first connecting structure such that the first and third connecting structures cooperate to securely attach the accessory adapter to the cabinet base. The accessory adapter is securely attached to the cabinet base and a water tight seal can be achieved between the accessory adapter and the cabinet base.

The accessory adapter also has a fourth connecting structure that is complementary to the second connecting structure such that the second and fourth connecting structures cooperate to securely attach the accessory adapter to the cabinet lid. The accessory adapter is securely attached to the cabinet lid and a water tight seal can be achieved between the accessory adapter and the cabinet lid.

In other aspects of the disclosure, the food transport cabinet and serving platform apparatus can include a heating device disposed in the interior space of the cabinet base. The heating device can provide direct or indirect heat to the serving pan.

The heating device can be attached to the accessory adapter and be positionable between the use position and a stowed position. In the stowed position, the heating device is outside of the interior space of the cabinet base.

In still other aspects of the disclosure, the accessory adapter further includes at least one support rail removably supported at the top side of the accessory adapter. The support rail spans between two opposed longitudinal sides of the accessory adapter and partitions a space defined by the two opposed lateral sides and the two opposed longitudinal sides of the accessory adapter. The accessory adapter has a peripheral ledge located near the top side of the accessory adapter with at least two recesses. The opposing ends of the support rail can be received and supported in the recesses.

In another aspect of the invention, the features (e.g., connecting structures, peripheral ledge, recesses, walls etc.) of the cabinet base, the accessory adapter and the cabinet lid can be constructed so as to provide poka-yoke assembly and/or attachment of the components.

In yet other aspects of the disclosure, the food transport cabinet and serving platform apparatus can include features (cleats and recesses) in the exterior of the bottom wall of the cabinet base and the exterior side of the cabinet lid which are correspondingly sized and shaped so as to be operable nest with one another when stacking the cabinet base upon the cabinet lid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A and 1B each show a front-top perspective view of examples of top-loading food transport cabinets known in the art;

FIG. 9 shows a front-top perspective view of an alternative example of a modular, multi-function, thermally-insulated, top-loading food transport cabinet and serving platform of the present disclosure;

FIG. 10 shows a front-top perspective view of the food transport cabinet and serving platform of FIG. 9 with the cabinet lid separated from the cabinet base;

Corresponding reference numerals indicate corresponding parts throughout the several views of the drawings.

DETAILED DESCRIPTION

Figure 1A:
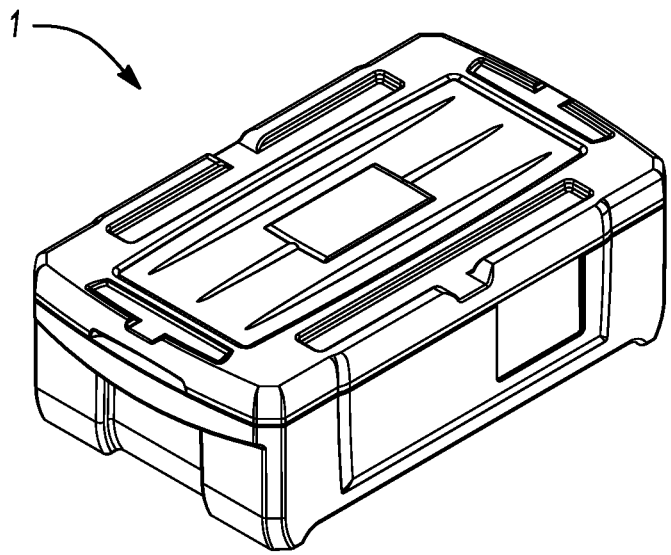

Example embodiments will now be described more fully with reference to the accompanying drawings. The example embodiments are provided so that this disclosure will be thorough, and will fully convey the scope to those who are skilled in the art. Numerous specific details are set forth to provide a thorough understanding of embodiments of the present disclosure. It will be apparent to those skilled in the art that the specific details described need not be employed in every instance, and that example embodiments may be embodied in many different forms such that neither should be construed to limit the scope of the disclosure. In some example embodiments, well-known device structures, and well-known technologies are not described in detail.

Referring now to the figures, a modular, top-loading, food transport cabinet and serving platform apparatus 10 is disclosed in various embodiments. The food transport cabinet and serving platform apparatus 10 of the present disclosure is advantageous because it is alternatively configurable in both a transport condition (e.g., for transporting or delivering prepared food while maintaining a desired (hot or cold) temperature of the food) and a serving condition (e.g., presenting the prepared food for serving while maintaining a desired (hot or cold) temperature of the food). Moreover, it can be flexibly configurable and can accommodate various food presentation and serving requirements and arrangements, including heating (e.g., chafing or direct heat) and chilling (e.g., ice) without having to remove the food items to be presented and served to a different serving platform.

As shown, for example, in FIGS. 2-4, 9-12 and 13-15, the food transport cabinet and serving platform apparatus 10, 100, 200 of the present disclosure generally includes a cabinet base 12, 112, 212, a cabinet lid 14, 114, 214 and an accessory adapter 16, 116, 216 (e.g., a serving adapter). The construction of the apparatus enables a food transport cabinet that provides a sturdy, structural and leak-proof container for food items during transportation, delivery, set up, presentation and serving of the food items. Moreover the accessory adapter 16, 116, 216 provides an interface for serving trays or pans 18, 20 (e.g., steam-table pans) and the like to be used or included with and in the container and during presentation and serving of the food items. In some embodiments, the apparatus incorporates heat sources for maintaining an elevated temperature for the food items contained therein. In some embodiments, the heat source can be implemented through the accessory adapter 16, 116, 216.

The food transport cabinet and serving platform 10, 100, 200 of the present disclosure can encompass multiple styles and sizes, and can accommodate standard food serving pans 18, 20 (e.g., steam-table pans), heating elements (e.g., for chafing or direct heat), as well as cans, bottles and jugs and ice. The food transport cabinet and serving platform apparatus 10, 100, 200 of the present disclosure can be used as an insulated open vessel for presenting and serving of food items and beverages.

Figure 5:
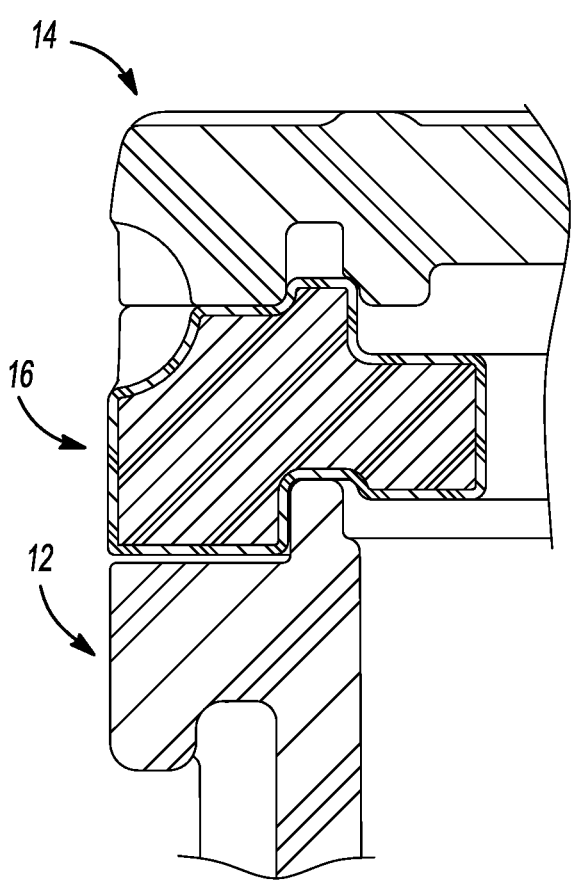
FIG. 5 is a partial cross-sectional view along the section line 5-5 of FIG. 2.
Figure 6:
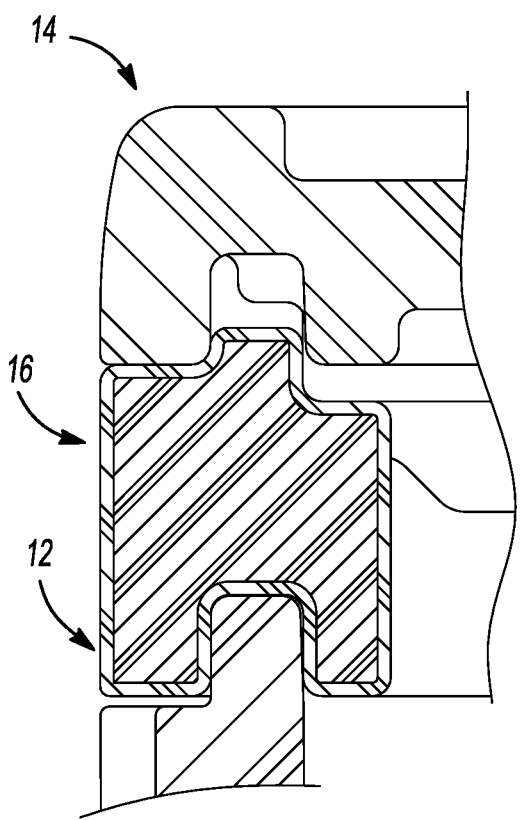
FIG. 6 is a partial cross-sectional view along the section line 6-6 of FIG. 2.

When the food transport cabinet and serving platform 10, 100, 200 is in the transport condition, the accessory adapter 16, 116, 216 is disposed between the cabinet base 12, 112, 212 and the cabinet lid 14, 114, 214. The cabinet base 12, 112, 212 is securely attached to a lower or first side 26 of the accessory adapter 16, 116, 216 and the cabinet lid 14, 114, 214 is securely attached to an upper or second side 28 of the accessory adapter 16, 116, 216, as illustrated in the figures, particularly FIGS. 5 and 6. When the food transport cabinet and serving platform is in the serving condition, the cabinet lid 14, 114, 214 is detached and removed from the second side 28 of the accessory adapter 16, 116, 216, while the first side 26 of the accessory adapter 16, 116, 216 remains securely attached to the cabinet base 12, 112, 212, as shown in, e.g., FIGS. 10 and 14.

The accessory adapter 16 is configured to removably attach to the cabinet base 12 and the cabinet lid 14. In some embodiments, connecting structures can be defined by complementary corresponding, mating, nesting and/or interlocking structures such as walls, channels, ribs, tabs and recesses and the like on the cabinet base 12, the accessory adapter 16 and the cabinet lid 14. The mating connecting features cooperate to help ensure and enhance the interlocking, secure structural interface and seal between the cabinet lid 14 and the accessory adapter 16, the accessory adapter 16 and the cabinet base 12 and the cabinet lid 14 and the cabinet base 12, as the case may be.

As is understood with reference, for example, to FIGS. 2, 3, 11, 12 and 15, the cabinet base 12 has provides a box-like receptacle or container having an open top 30 and defining a lower interior space 32. The interior space 32 of the cabinet base 12 receptacle is bounded by a closed bottom wall 34 and several closed side walls 36 extending upward from the bottom wall 34. As shown, the cabinet base 12 is generally rectangular-shaped with four side walls 36, although other shapes can be employed. The side walls 36 extend vertically upward from the bottom wall 34 and terminate at an upper end (e.g., top 30) of the receptacle opposite to the bottom wall 34. The upper end 30 of the receptacle therefore, provides an opening into the receptacle and access to the lower interior space 32. The cabinet base 12 is adapted to structurally connect to either or both the accessory adapter 16 and the cabinet lid 14, as further discussed herein.

Figure 2:
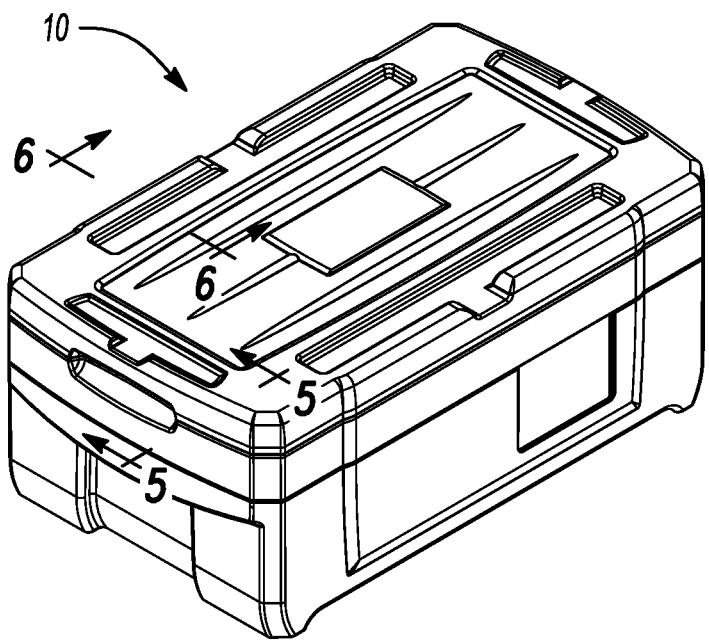
FIG. 2 shows a front-top perspective view of one example of a modular, multi-function, thermally-insulated, top-loading food transport cabinet and serving platform of the present disclosure.

Located at the upper end 30 of the receptacle of the cabinet base 12 is a first connecting structure 38. In some embodiments, such as shown in FIG. 2, the first connecting structure 38 can be formed as a first peripheral wall 40 vertically protruding upwardly from the upper end 30 (i.e., in the direction away from the bottom wall 34). The first peripheral wall 40 can extend along the entirety or just a portion of a perimeter of the upper end 30 of the receptacle of the cabinet base 12.

With continued reference to FIG. 2, the first connecting structure 38 can be generally rectangular shaped. As such, the peripheral wall 40 can include four corner portions 42. In addition, the first connecting structure 38 can also include one or more ribs 44 that can project outwardly (i.e., in a direction away from the lower interior space 32 of the cabinet base 12) from a side of the peripheral wall 40 at the four corner portions 42 of the peripheral wall. Although all four corner portions 42 can include at least one first rib 44, the first connecting structure 38 can employ various other combinations of rib(s) 44 at any or all of the corner portions 42.

Figure 11:
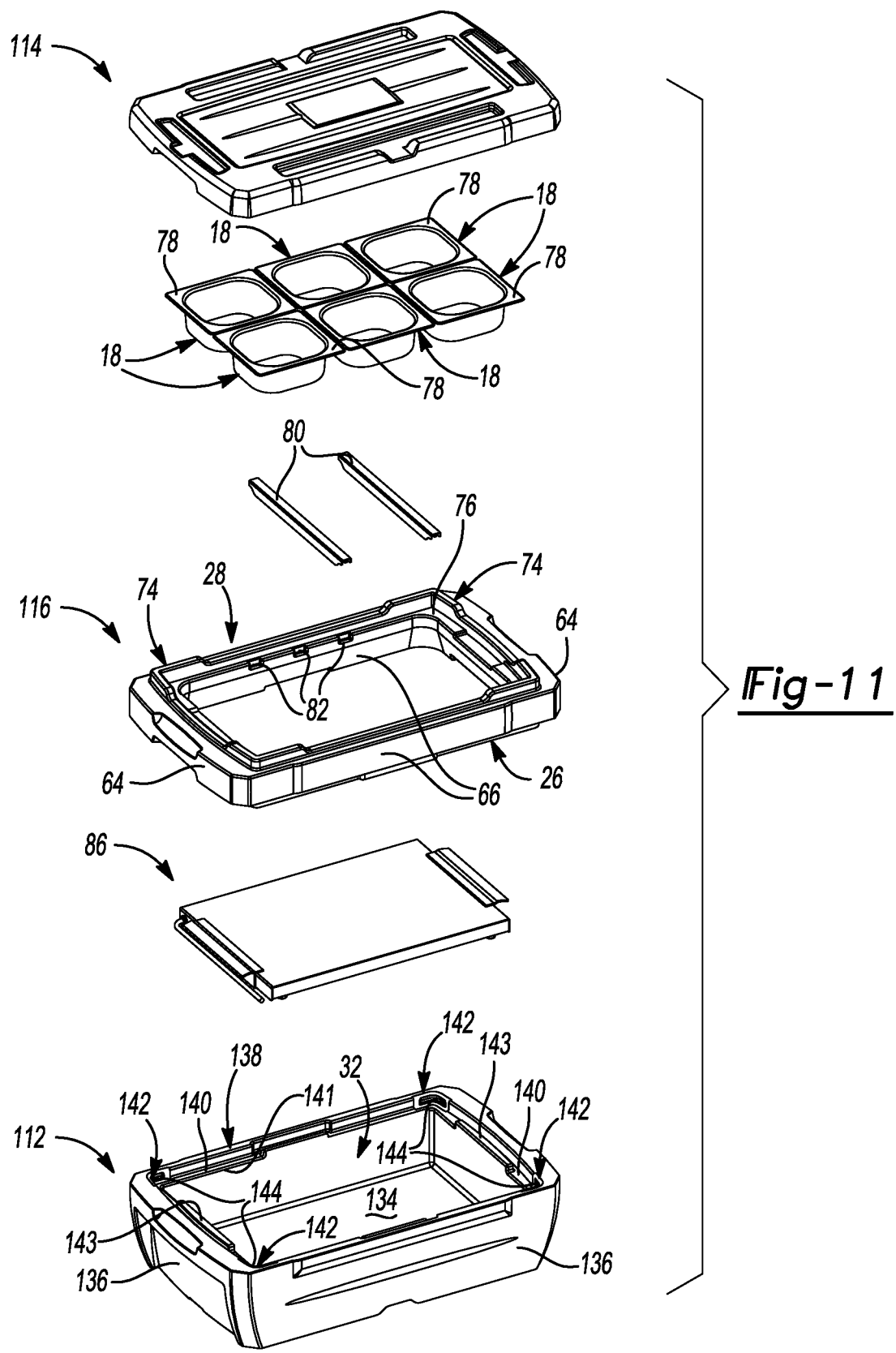
FIG. 11 shows an exploded, front-top perspective view perspective view of the food transport cabinet and serving platform of FIG. 9.

In other embodiments, for example as shown in FIG. 11, the first connecting structure 138 can include a peripheral channel 140 formed vertically below the upper end 130 (i.e., in the direction nearer to the bottom wall 134). The peripheral channel 140 can extend along the entirety or just a portion of a perimeter of the upper end 130 of the cabinet base 112. The peripheral channel 140 can include a ledge 141 that defines a lower surface of the peripheral channel 140 and a peripheral wall 143 that projects upwardly from a laterally inward (i.e., in the direction toward the interior space of the receptacle) side of the ledge 141. The peripheral wall 143 can extend along the entirety or just a portion of a perimeter of the peripheral channel 140.

Again, the first connecting structure 138 can be generally rectangular shaped and include four corner portions 142. Some or all of the corner portions 142 can include one or more first recesses 144 that extend into the peripheral wall 143.

The cabinet base 12, 112, 212 can be formed as a unitary plastic structure. In one example, the bottom wall and side walls can be formed with a hard shell double-wall polymer structure and a hollow interior space between surfaces of the double wall, such as by roto-molding or injection molding manufacturing processes. Thereafter, the hollow interior space of the double-wall can be filled with a material (e.g., a urethane foam) to enhance the thermal insulating properties of the cabinet base 12, 112, 212. In another example, the cabinet base 12, 112, 212 can be manufactured by expanded polypropylene (EPP) bead molding which can produce the cabinet base 12, 112, 212 as an insulated structural product in a single manufacturing process.

Consequently, the construction of the cabinet base 12, 112, 212 provides desired thermal insulating properties and enables the cabinet base 12, 112, 212 to be resistant to heat transfer through the bottom 34, 134, 234 and side walls 36, 136, 236 of the cabinet base 12, 112, 212. Further, the cabinet base 12, 112, 212 construction makes the cabinet base 12, 112, 212 leak-proof such that fluids (e.g., water, melting ice) cannot leak from the lower interior space 32 through the bottom 34, 134, 234 and side walls 36, 136, 236 of the cabinet base 12, 112, 212.

Figure 3:
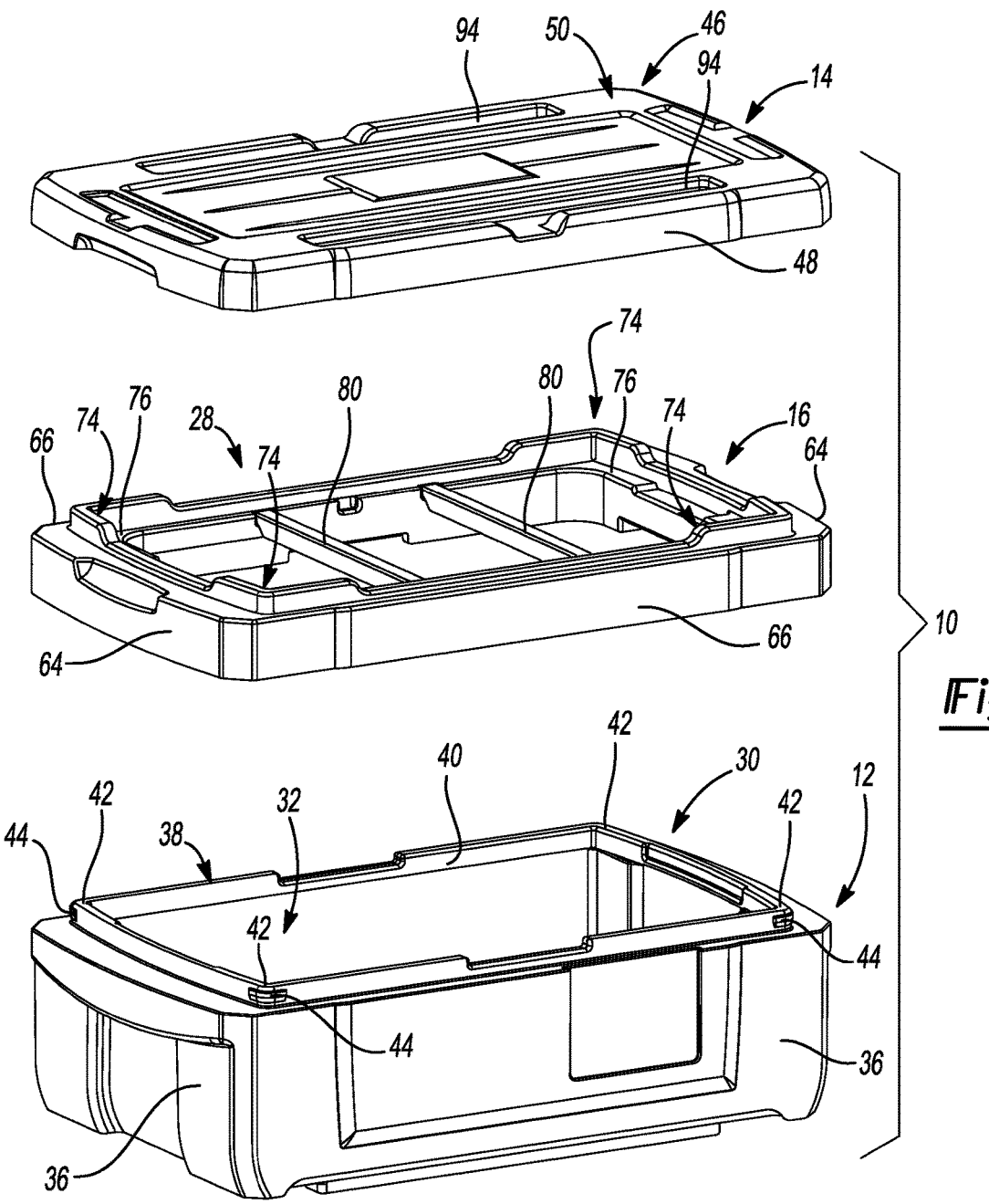
FIG. 3 shows an exploded, front-top perspective view perspective view of the food transport cabinet and serving platform of FIG. 2.
Figure 4:
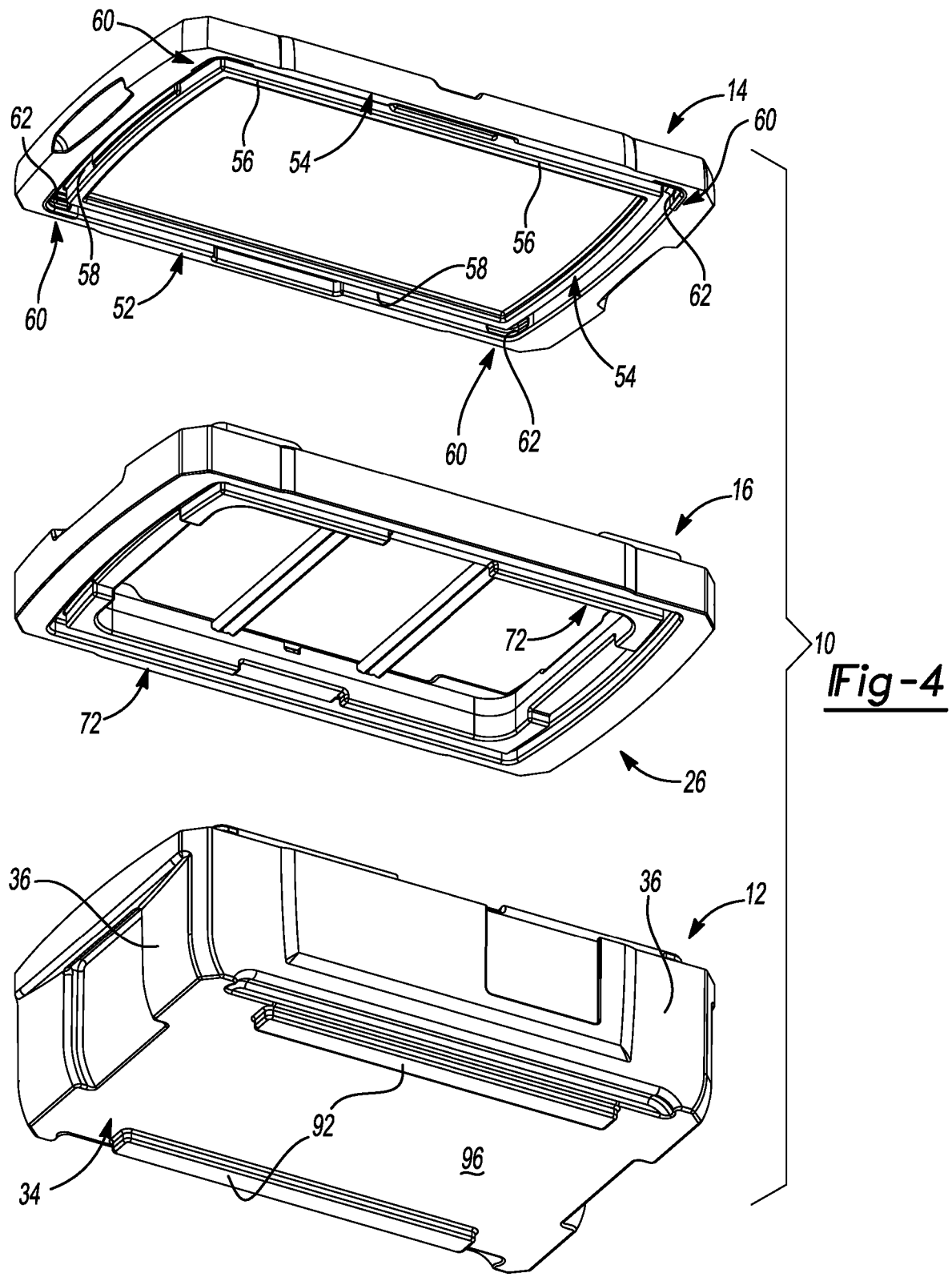
FIG. 4 shows an exploded, bottom-front perspective view of the food transport cabinet and serving platform of FIG. 2.

Turning again to the figures, particularly FIGS. 3 and 4, the cabinet lid 14, 114 can form a closed top wall 46 and a peripheral side wall 48 that can extend about the perimeter of the top wall 46. The cabinet lid 14, 114 can have an exterior side 50 and an interior side 52. The cabinet lid 14, 114 can be sized and shaped to closely and securely attach to the accessory adapter 16, 116 and/or the cabinet base 12, 112, as the case may be.

Figure 1B:
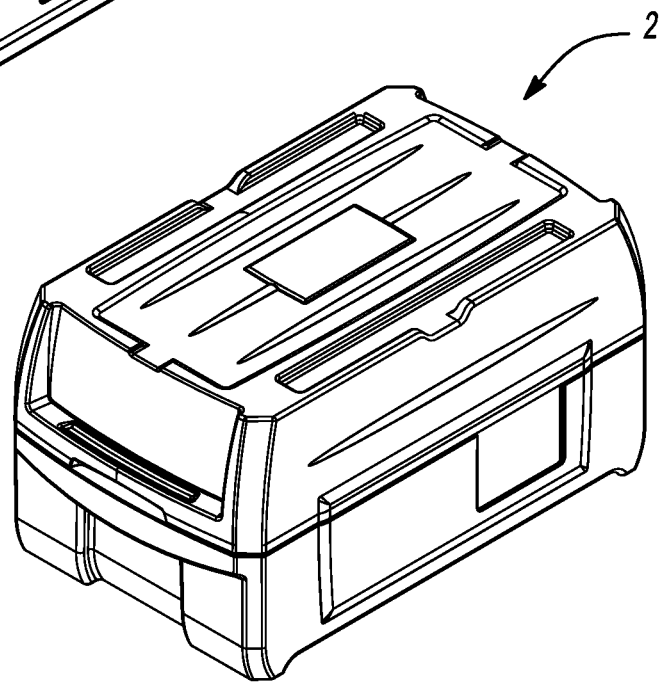

In some embodiments, the cabinet lid can include an extended-length peripheral side wall (a so-called "tall" lid such as the cabinet lid shown on the transport cabinet 2 in FIG. 1B). The tall cabinet lid defines an upper interior space. When the food transport cabinet and serving platform of the disclosure includes the tall cabinet lid, and the tall cabinet lid is attached to the cabinet base in the transport condition, the upper interior space and the lower interior space of the cabinet base can combine to form a single, larger interior space for containing food items, bottles, jugs or stacks of serving pans for transport.

Further, a tall cabinet lid can also be employed with the accessory adapter in the serving condition. In this regard, the tall lid can serve as the base of the apparatus by being inverted so that it rests on the top wall and the upper interior space of the tall lid can be utilized.

Figure 12:
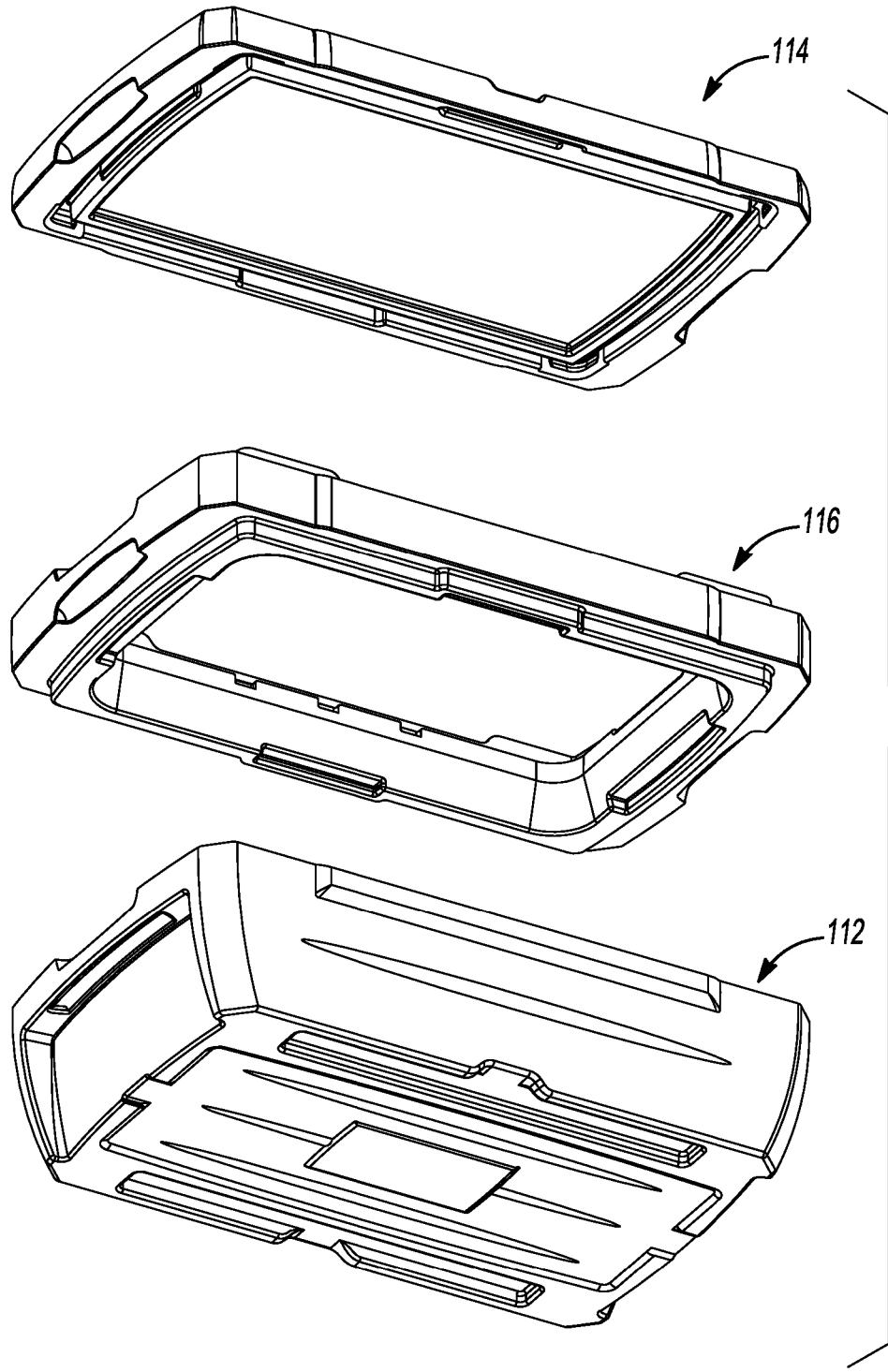
FIG. 12 shows an exploded, bottom-front perspective view of the cabinet lid, accessory adapter and cabinet base of the food transport cabinet and serving platform of FIG. 9.
Figure 13:
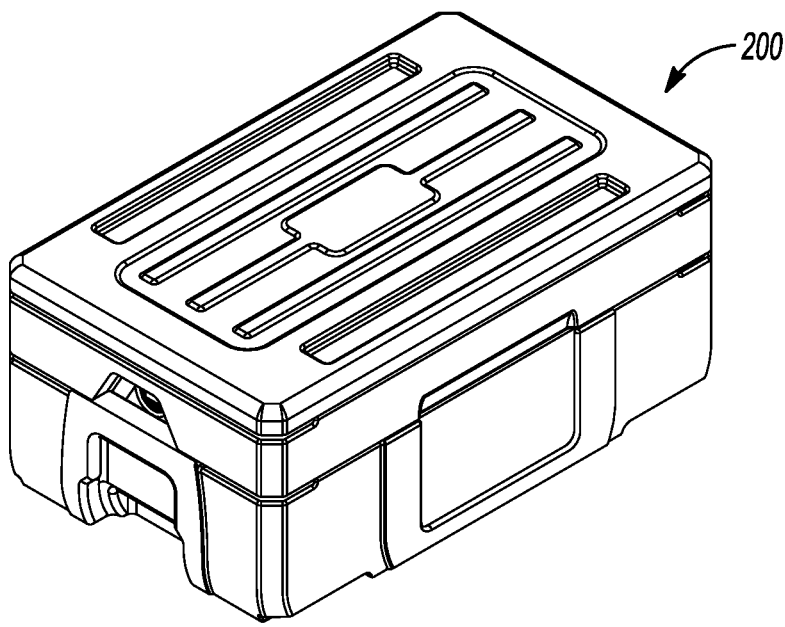
FIG. 13 shows a top-front perspective view of yet another alternative example of a modular, multi-function, thermally-insulated, top-loading food transport cabinet and serving platform of the present disclosure.
Figure 14:
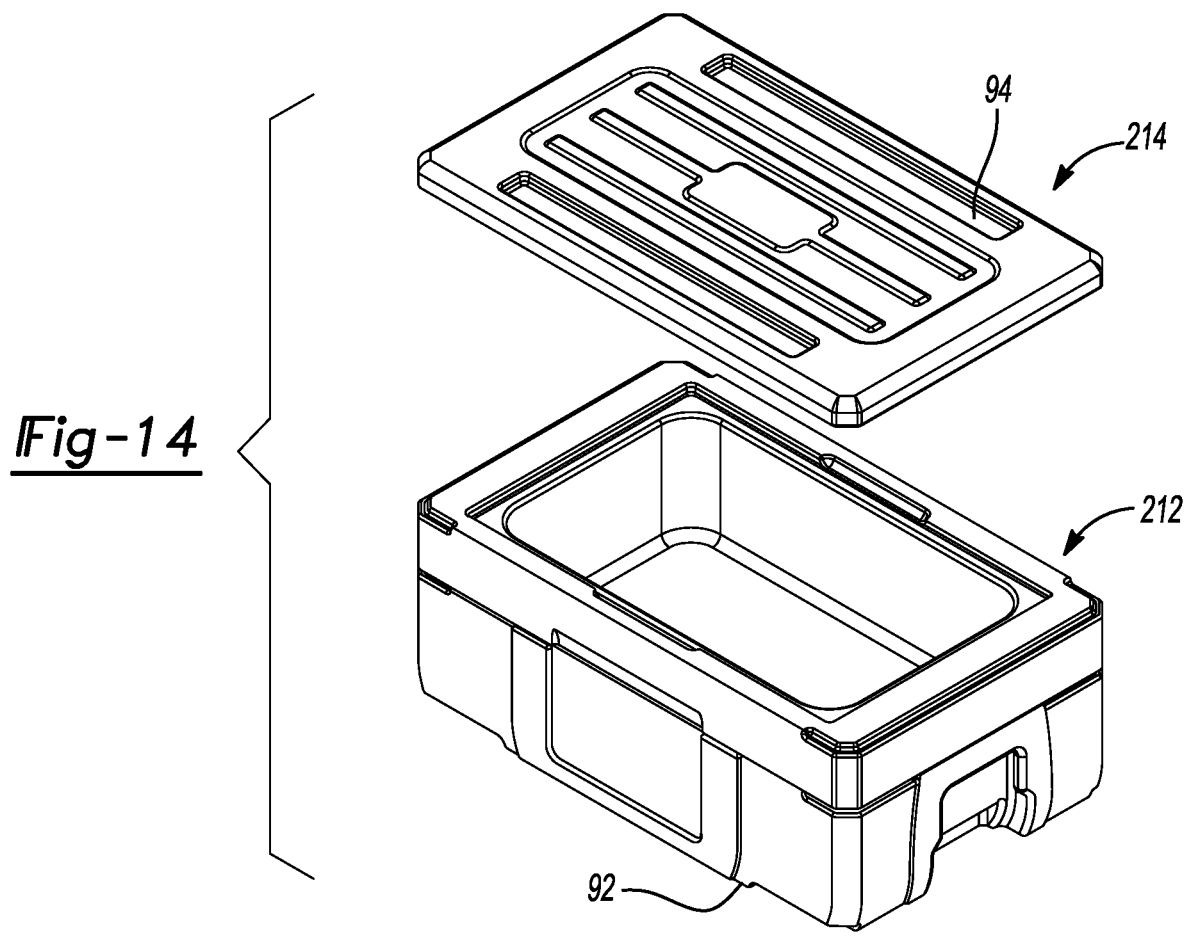
FIG. 14 shows a front-top perspective view of the food transport cabinet and serving platform of FIG. 13 with the cabinet lid separated from the cabinet base.

With reference to FIGS. 4 and 12, included on the interior side 52 of the cabinet lid 14, 114 is a second connecting structure 54. The second connecting structure 54 can include a peripheral wall 56 that can project from the interior side 52 of the cabinet lid 14, 114 and a peripheral channel 58 that can be located laterally offset from to the peripheral wall 56. The second connecting structure 54, as shown, can be generally rectangular shaped. Accordingly, the peripheral channel 58 can include four corner portions 60. Similar to the first connecting structure 38 already discussed, the second connecting structure 54 can also include one or more second recesses 62 that can be depressed or set into a side of the peripheral channel 58 at all or some of the four second corner portions 60 of the peripheral channel 58.

Similar to the cabinet base 12, 112, 212, the cabinet lid 14, 114, 214 can be formed as a unitary plastic structure and have a hard shell double-wall polymer structure formed with a hollow interior space between surfaces of the double wall. An insulating material (e.g., urethane foam) can be provided in the hollow space to enhance the thermal insulating properties of the cabinet lid. Alternatively, the cabinet lid can be manufactured by EPP bead molding, as discussed above.

Just as with the cabinet base, the construction of the cabinet lid provides thermal insulating properties and enables the cabinet lid to be resistant to heat transfer and fluid leakage through the cabinet lid.

Several embodiments of the accessory adapter 16, 116, 216 of the present disclosure are shown throughout the figures. The accessory adapter 16, 116, 216 is sized and shaped to closely and securely attach to the cabinet base 12, 112, 212 and to the cabinet lid 14, 114, 214. The accessory adapter 16, 116, 216 can generally have a closed annular or rectangular shape (e.g., as in a top view) formed by two opposed lateral sides 64 and two opposed longitudinal sides 66. The accessory adapter 16, 116, 216 has a bottom or lower first side 26 and a top or upper second side 28. As shown in the figures, the first side 26 of the accessory adapter 16, 116, 216 is configured to removably attach to the cabinet base 12, 112, 212. The second side 28 of the accessory adapter 16, 116, 216 is configured to removably attach to the cabinet lid 14, 114, 214.

As such, the accessory adapter 16, 116, 216 can positioned intermediate the cabinet base 12, 112, 212 and the cabinet lid 14, 114, 214. For example, when the food transport cabinet and serving platform 10, 100, 200 is in the transport condition, the accessory adapter 16, 116, 216 is disposed between the cabinet base 12, 112, 212 and the cabinet lid 14, 114, 214 and the first side 26 of the accessory adapter 16, 116, 216 is securely attached and sealed to the cabinet base 12, 112, 212 and the second side 28 of the accessory adapter 16, 116, 216 is securely attached and sealed to the cabinet lid 14, 114, 214. However, when the food transport cabinet and serving platform 10, 100, 200 is in the serving condition, the first side 26 of the accessory adapter 16, 116, 216 remains attached to the cabinet base 12, 112, 212, but the cabinet lid 14, 114, 214 is detached and removed from the second side 28 of the accessory adapter 16, 116, 216.

Similarly as discussed with respect to the cabinet base 12, 112, 212 and the cabinet lid 14, 114, 214, the accessory adapter 16, 116, 216 also can include connecting structure. In particular, the first side 26 of the accessory adapter 16, 116, 216 can include a third connecting structure 72 that is complementary to the first connecting structure 38 of the cabinet base 12. By complementary, it should be understood that the third connecting structure 72 can include corresponding structure 38 or features that interlock, nest and/or otherwise mate with the features of the first connecting structure 38 so as to cooperate to securely attach and seal the accessory adapter 16, 116, 216 to the cabinet base 12, 112, 212. The connecting structures can have a tight or slight interference fit.

When the accessory adapter 16, 116, 216 is securely attached to the cabinet base 12, 112, 212, an interlocking and structural connection and water tight seal can be achieved between the accessory adapter 16, 116, 216 and the cabinet base 12, 112, 212.

Moreover, the second side 28 of the accessory adapter 16, 116, 216 can include a fourth connecting structure 74 that is complementary to the second connecting structure 54 of the cabinet lid 14, 114, 214. Similar to the description already provided, the second connecting structure 54 and the fourth connecting structure 74 cooperate to securely attach and seal the accessory adapter 16, 116, 216 to the cabinet lid 14, 114, 214 to achieve an interlocking and structural connection and water tight seal between the accessory adapter 16, 116, 216 and the cabinet lid 14, 114, 214.

In some embodiments, the mating connecting structures (i.e., the first and third connecting structures 38, 138, 72 and the second and fourth connecting structures 54, 74) additionally or alternatively can be supplemented or defined by interlocking and nesting tab and recess features on the cabinet base 12, 112, 212, the accessory adapter 16, 116, 216 and the cabinet lid 14, 114, 214. In such embodiments, the tabs and recesses cooperate to help ensure that the inner vertical surfaces of the adjacent side walls of the mating components (e.g., the cabinet base 12, 112, 212 and/or accessory adapter 16, 116, 216 and/or cabinet lid 14, 114, 214) can be properly aligned with one another. Moreover, these features can also enhance the interlocking, secure structural interface and seal between the cabinet lid 14, 114, 214 and the accessory adapter 16, 116, 216, the accessory adapter 16, 116, 216 and the cabinet base 12, 112, 212 and the cabinet lid 14, 114, 214 and the cabinet base 12, 112, 212, as the case may be.

The food transport cabinet and serving platform of the present disclosure, when in the transport condition, provides a structurally robust and leak proof means for transporting and delivering food items while maintaining the food at or within a desired temperature or temperature range.

Figure 7:
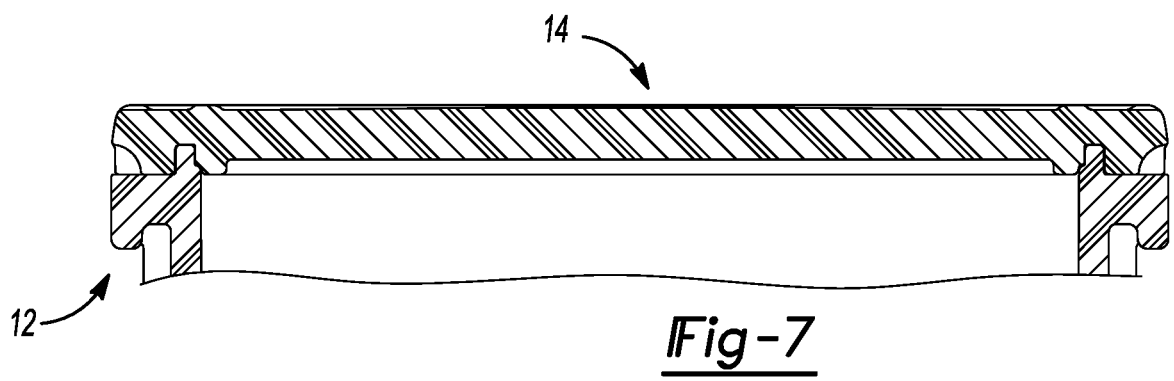
FIG. 7 shows a partial cross-sectional view along a longitudinal axis of an exemplary food transport cabinet and serving platform of the present disclosure in a transport condition with the accessory adapter removed and the cabinet lid attached directly to the cabinet base.
Figure 8:
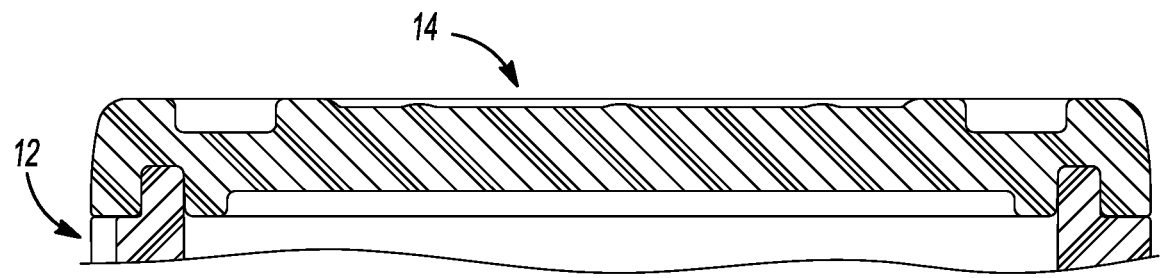
FIG. 8 shows a partial cross-sectional view along a lateral axis of the exemplary food transport cabinet and serving platform of FIG. 7.

In some embodiments of the food transport cabinet and serving platform of the present disclosure, the accessory adapter 16, 116, 216 can be entirely removed from the apparatus 10, 100, 200 and the apparatus can still function as a food transport cabinet. In such embodiments, the cabinet lid 14, 114, 214 can be attached directly to the cabinet base 12, 112, 212 when the accessory adapter 16, 116, 216 is detached from the food transport cabinet and serving platform (such as shown in FIGS. 7 and 8) and still provide a structurally robust and leak proof means for delivering and transporting food items while maintaining the food at or within a desired temperature or temperature range.

Figure 15:
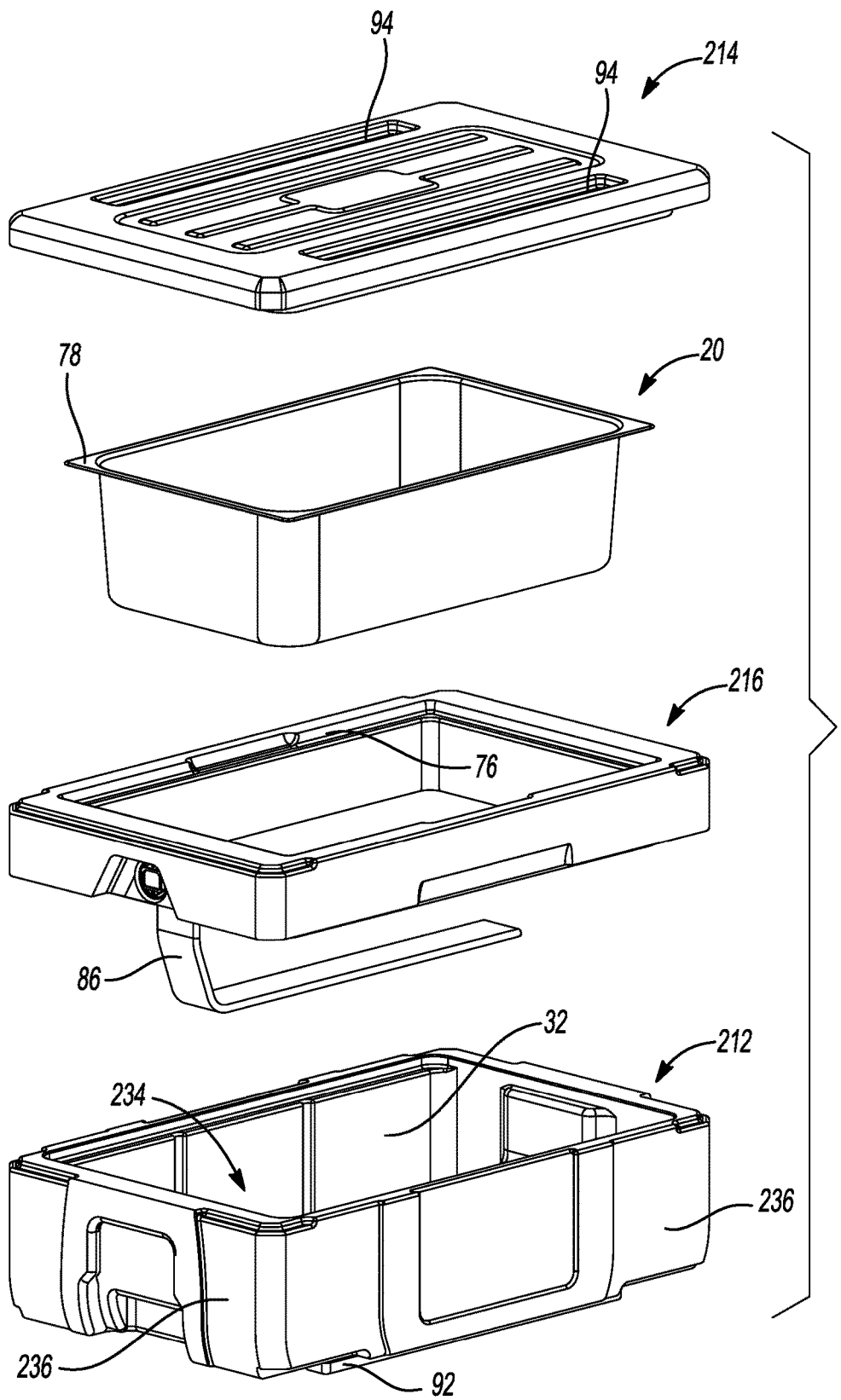
FIG. 15 shows an exploded, front-top perspective view perspective view of the food transport cabinet and serving platform of FIG. 13.

One or both of the second side and the first side of the accessory adapter can also include a peripheral ledge 76. Referring to FIGS. 3, 11 and 15, the peripheral ledge 76 can be employed to support a serving pan on the accessory adapter 16, 116, 216. As can be understood by the figures (e.g., FIGS. 10 and 14), the serving pan 18, 20 can occupy at least a portion of the space bounded by the two opposed lateral sides 64 and the two opposed longitudinal sides 66 of the accessory adapter 16, 116, 216 and, depending upon the depth of the pan 18, 20, can extend into at least a portion of the lower interior space 32 of the cabinet base 12, 112, 212.

As seen in FIGS. 11 and 15, the serving pan 18, 20 can include a peripheral edge 78 or rim located at or defining a part of an upper portion of the serving pan 18, 20. In some embodiments, the serving pan 18, 20 can be supported at the rim 78 of the serving pan 18, 20 by at least the peripheral ledge 76 of the accessory adapter 16, 116, 216.

In some embodiments, the accessory adapter 16, 116, 216 can also incorporate one or more support rails 80, as shown in FIGS. 3, 4 and 11. The support rails 80 can be removably supported on the accessory adapter 16, 116. For example, a support rail 80 can span between two opposed sides (e.g., the longitudinal sides 66 or the lateral sides 64) of the accessory adapter 16, 116. Accordingly, in some embodiments, the peripheral ledge 76 of the accessory adapter 16, 116 can include at least two recesses 82. Then, each opposing end 84 of a support rail 80 can be received, respectively, in one of the recesses 82.

When installed, the support rail(s) 80 can partition the interior space defined by the two opposed lateral sides 64 and the two opposed longitudinal sides 66 of the accessory adapter 16, 116. One or more support rails 80 can then, either alone or in conjunction with the peripheral ledge 76 of the accessory adapter 16, 116, support one or more serving pans 18, 20 of various sizes for containing food, as can be understood by, e.g., FIGS. 10 and 14.

It can be understood from the present disclosure that the features of the cabinet base, accessory adapter and cabinet lid (e.g., connecting structures, ledge, recesses, channels, walls, etc.) can be constructed or configured so as to provide a poka-yoke assembly and/or attachment of the components of the food transport cabinet and serving platform.

Figure 16:
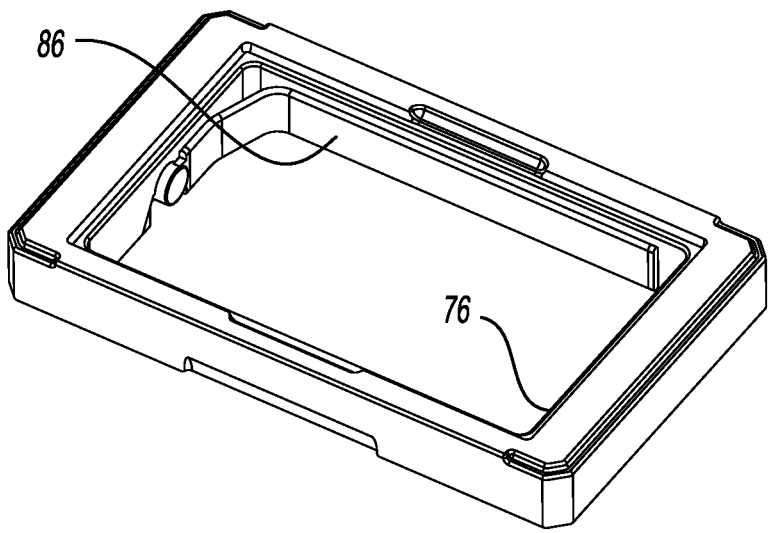
FIG. 16 shows an accessory adapter for the food transport cabinet and serving platform of FIG. 13 including an exemplary heating element in a stowed position.
Figure 17:
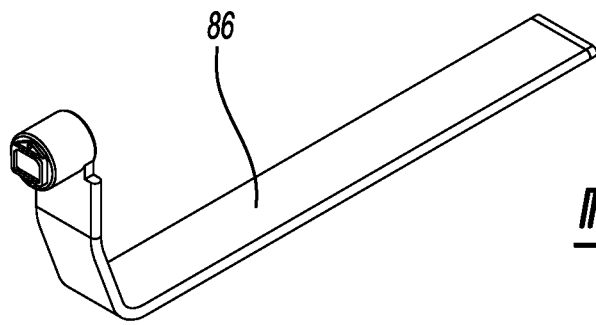
FIG. 17 shows a front perspective detail view of the exemplary heating element of FIG. 16.

With reference to FIGS. 11 and 15, in some embodiments, the food transport cabinet and serving platform of the present disclosure can further include a heating device 86 (power cords not shown). The heating device 86 can include an electric heating element. For example, a heating device 86 can be disposed in the interior space 32 of the cabinet base 12, as understood by FIG. 11. Alternatively, a heating device 86 can be attached to the accessory adapter 216, as shown in FIGS. 15 and 16. As best seen in those figures, the heating device 86 attached to the accessory adapter 216 can be moveable between a deployed or use position (FIG. 15) and a stowed or non-use position (FIG. 16).

Figure 18A:
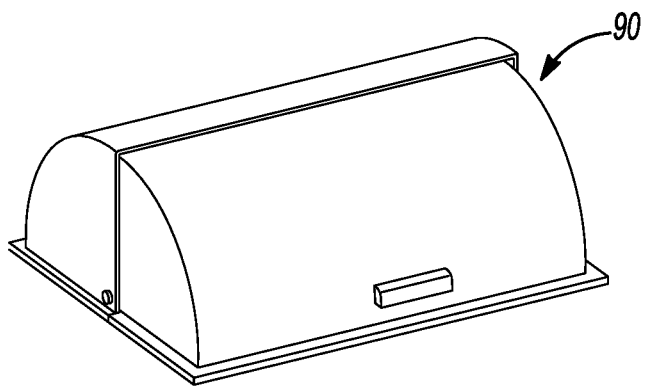
FIGS. 18A and 18B show perspective views of different known chafing dish covers.
Figure 18B:
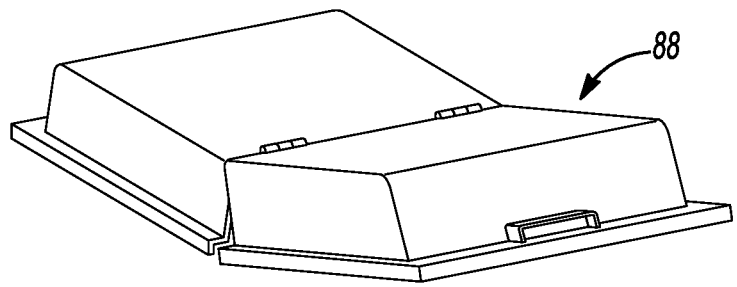

With the addition of a heating element, the food transport cabinet and serving platform of the present disclosure can be converted in to a heated chafing dish whereby the heating element heats a water bath contained in the lower interior space 32 of the cabinet base 12, 112, 212 while a serving pan 18, 20 is supported above the heated water by the accessory adapter 16, 116, 216. Alternatively, the heating element can warm the serving pan directly without water. Further, in the serving condition the cabinet lid 14, 114, 214 of the apparatus can be replaced with a standard hinged 88 or roll-top 90 chafing lid, as illustrated in FIGS. 18A and 18B.

The apparatus of the present disclosure allows a caterer to transport food to an event in the insulated carrier and simply plug it in to create a heated chaffing server. This heating element can be folded for storage without removal from the accessory adapter. This eliminates the requirement for the caterer to transport and set-up separate chaffing equipment, saving time effort and money.

Additionally, the food transport cabinet and serving platform of the present disclosure can include features to facilitate securely stacking several of the apparatus upon one another when in the transport condition. In this regard, the cabinet base 12, 112, 212 can include one or more cleats 92 and/or recesses 94 and the cabinet lid 14, 114, 214 can include one or more recesses 94 and/or cleats 92.

With further reference to the figures, the cabinet lid 14, 114, 214 can include one or more longitudinally extending recesses 94 extending into the exterior side of the top wall of the cabinet lid. Similarly, an exterior surface 96 of the bottom wall of the cabinet base 12, 112, 212 (e.g., on the side away from the lower interior space) can include a corresponding number longitudinally extending cleats 92 projecting from the exterior surface of the bottom wall. As can be readily understood, when in the transport condition, multiple similarly configured apparatus can be stacked upon one another. For example, the cleats 92 of the cabinet base of an upper apparatus can be received in and nest with the recesses 94 of the cabinet lid of a second apparatus when the first apparatus is stacked upon the second apparatus.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A modular, top-loading, food transport cabinet and serving platform comprising:
    a cabinet base;
    a cabinet lid; and
    an accessory adapter;
    wherein the food transport cabinet and serving platform is alternatively configurable in both a transport condition and a serving condition;
    wherein the accessory adapter has a bottom side and a top side;
    wherein the bottom side of the accessory adapter is configured to removably attach to the cabinet base and the top side of the accessory adapter is configured to removably attach to the cabinet lid;
    wherein, when the food transport cabinet and serving platform is in the transport condition, the accessory adapter is disposed between the cabinet base and the cabinet lid, the bottom side of the accessory adapter is sealingly attached to the cabinet base and the top side of the accessory adapter is sealingly attached to the cabinet lid;
    wherein, when the food transport cabinet and serving platform is in the serving condition, the cabinet lid is detached from the top side of the accessory adapter while the bottom side of the accessory adapter remains sealingly attached to the cabinet base;
    at least one serving pan comprising a peripheral rim defining at least part of an upper portion of the at least one serving pan; and
    wherein the at least one serving pan is supported at the peripheral rim by the accessory adapter so that the at least one serving pan occupies at least a portion of an interior space of the cabinet base.

2. The food transport cabinet and serving platform of claim 1, wherein the cabinet base comprises a box-like receptacle defining the interior space and comprising an open upper end and a first connecting structure located at the upper end, wherein the first connecting structure extends along at least a portion of a perimeter of the upper end, wherein the first connecting structure comprises a first peripheral wall protruding from the upper end in a first direction;
    wherein the cabinet lid comprises an exterior side and an interior side and a second connecting structure located on the interior side of the cabinet lid, the second connecting structure comprising a second peripheral wall projecting from the interior side and a peripheral channel located laterally adjacent to the second peripheral wall;
    wherein the bottom side of the accessory adapter comprises a third connecting structure that is complementary to the first connecting structure such that the first and third connecting structures cooperate to securely attach the accessory adapter to the cabinet base;

wherein, when the accessory adapter is securely attached to the cabinet base, a first water tight seal is achieved between the accessory adapter and the cabinet base;

wherein the top side of the accessory adapter comprises a fourth connecting structure that is complementary to the second connecting structure such that the second and fourth connecting structures cooperate to securely attach the accessory adapter to the cabinet lid; and wherein, when the accessory adapter is securely attached to the cabinet lid, a second water tight seal is achieved between the accessory adapter and the cabinet lid.

3. The food transport cabinet and serving platform of claim 2, wherein the cabinet base comprises a closed bottom wall and a plurality of closed side walls extending from the bottom wall, the plurality of side walls terminating at the upper end of the cabinet base;

wherein the cabinet base is resistant to heat transfer through the cabinet base;

wherein the interior space of the cabinet base is watertight;

wherein the cabinet lid comprises a closed top wall having a sidewall extending around the perimeter of the top wall; and wherein the cabinet lid is resistant to heat transfer through the cabinet lid.

4. The food transport cabinet and serving platform of claim 3, wherein the bottom wall of the cabinet base has an interior side and exterior side, wherein the exterior side is located outside of the interior space, wherein the exterior side comprises at least one cleat or recess;

wherein the exterior side of the cabinet lid comprises at least one recess or cleat; and wherein the at least one cleat or recess of the exterior side of the bottom wall of the cabinet base and the at least one recess or cleat of the exterior side of the cabinet lid are correspondingly sized and shaped so as to be operable nest with one another when stacking the cabinet base upon the cabinet lid.

5. The food transport cabinet and serving platform of claim 2, wherein the first connecting structure is generally rectangular shaped and the first peripheral wall includes four first corner portions, wherein the first connecting structure further comprises a first rib protruding from a first side of the first peripheral wall in a second direction at each of the four first corner portions of the first peripheral wall;

wherein the second connecting structure is generally rectangular shaped and the peripheral channel includes four second corner portions, wherein the second connecting structure further comprises a second recess in a side of the peripheral channel in the second direction, wherein the second recess is included at each of the four second corner portions of the peripheral channel; and wherein the accessory adapter is generally rectangular shaped and comprises two opposed lateral sides and two opposed longitudinal sides.

6. The food transport cabinet and serving platform of claim 1 further comprising a heating device disposed in the interior space of the cabinet base when in a use position.

7. The food transport cabinet and serving platform of claim 6, wherein the heating device provides direct heat to the serving pan.

8. The food transport cabinet and serving platform of claim 6, wherein the heating device provides indirect heat to the serving pan.

9. The food transport cabinet and serving platform of claim 6, wherein the heating device is attached to the accessory adapter; and wherein the heating device is positionable between the use position and a stowed position.

10. The food transport cabinet and serving platform of claim 9, wherein when the heating device is in the stowed position, the heating device is outside of the interior space of the cabinet base.

11. The food transport cabinet and serving platform of claim 1, wherein the accessory adapter is generally rectangular shaped and comprises two opposed lateral sides and two opposed longitudinal sides;

wherein the accessory adapter further comprises at least one support rail removably supported at the top side of the accessory adapter;

wherein the at least one support rail spans between the two opposed longitudinal sides of the accessory adapter; and wherein the at least one support rail partitions a space defined by the two opposed lateral sides and the two opposed longitudinal sides of the accessory adapter.

12. The food transport cabinet and serving platform of claim 11, wherein the accessory adapter comprises a peripheral ledge located near the top side of the accessory adapter;

wherein the peripheral ledge comprises at least two recesses;

wherein each of two opposing ends of the at least one support rail is received, respectively, in one of the two recesses.

13. The food transport cabinet and serving platform of claim 12, wherein the serving pan is supported at the peripheral rim of the serving pan by the at least one support rail.

14. A top-loading, food transport cabinet and serving platform that is alternatively configurable between a transport condition and a serving condition, comprising:

a cabinet base;

a cabinet lid; and an accessory adapter comprising two opposed lateral sides and two opposed longitudinal sides, a top side, a bottom side and a peripheral ledge extending along the two lateral sides and the two longitudinal sides;

wherein one or both of the cabinet base and the cabinet lid define an interior space;

a serving pan supported by the accessory adapter at the peripheral ledge such that the serving pan occupies at least a portion of the interior space;

wherein the bottom side of the accessory adapter is configured to removably attach to the cabinet base and a top side of the accessory adapter is configured to removably attach to the cabinet lid;

wherein, when the food transport cabinet and serving platform is in the transport condition, the serving pan is inaccessible, the accessory adapter is disposed between the cabinet base and the cabinet lid, the bottom side of the accessory adapter is attached to the cabinet base and the top side of the accessory adapter is attached to the cabinet lid, a water tight seal is formed between the cabinet base and the accessory adapter and the accessory adapter and the cabinet lid;

wherein, when the food transport cabinet and serving platform is in the serving condition, one of the cabinet lid and the cabinet base is detached from the accessory adapter while the other of the cabinet base and the cabinet lid remains attached to the accessory adapter and the serving pan is accessible.

15. The food transport cabinet and serving platform of claim 14 further comprising a heating device disposed in the interior space of the cabinet base;
   wherein the heating device is supported by the accessory adapter;
   wherein the heating device is positionable between a use position and a stowed position; and
   wherein when the heating device is in the stowed position, the heating device is removed from the interior space of the cabinet base.

16. The food transport cabinet and serving platform of claim 14, wherein the accessory adapter is generally rectangular shaped and comprises two opposed lateral sides and two opposed longitudinal sides;
   wherein the accessory adapter further comprises at least one support rail removably supported at the top side of the accessory adapter;
   wherein the at least one support rail spans between the two opposed longitudinal sides of the accessory adapter; and
   wherein the at least one support rail partitions a space defined by the two opposed lateral sides and the two opposed longitudinal sides of the accessory adapter.

17. The food transport cabinet and serving platform of claim 16, wherein the accessory adapter comprises a peripheral ledge located near the top side of the accessory adapter;
   wherein the peripheral ledge comprises at least two recesses;
   wherein each of two opposing ends of the at least one support rail is received, respectively, in one of the two recesses.

18. The food transport cabinet and serving platform of claim 17, wherein the serving pan is supported at a peripheral rim of the serving pan by the at least one support rail.

19. The food transport cabinet and serving platform of claim 14, wherein a bottom wall of the cabinet base has an interior side and exterior side, wherein the exterior side is located outside of the interior space, wherein the exterior side comprises at least one first cleat or first recess;
   wherein the exterior side of the cabinet lid comprises at least one second recess or second cleat; and
   wherein the at least one first cleat or first recess of the exterior side of the bottom wall of the cabinet base and the at least one second recess or second cleat of the exterior side of the cabinet lid are correspondingly sized and shaped so as to be operable nest with one another when stacking the cabinet base upon the cabinet lid.

20. The food transport cabinet and serving platform of claim 14 further comprising a heating device configured to be disposed in the interior space of the cabinet base.

* * * * *